(No Model.)

D. G. COYNER.
COMBINED HARVESTER AND THRESHER.

No. 598,558. Patented Feb. 8, 1898.

Attest.
Ida Heitz
Samuel McQuinn

Inventor.
David G. Coyner.
by James H. Layman
Atty.

UNITED STATES PATENT OFFICE.

DAVID G. COYNER, OF LYNDON, OHIO.

COMBINED HARVESTER AND THRESHER.

SPECIFICATION forming part of Letters Patent No. 598,558, dated February 8, 1898.

Application filed January 23, 1897. Serial No. 620,344. (No model.)

*To all whom it may concern:*

Be it known that I, DAVID G. COYNER, a citizen of the United States, residing at Lyndon, in the county of Ross and State of Ohio, have invented certain new and useful Improvements in a Combined Harvester and Thresher; and I do hereby declare the following to be a full, clear, and exact description of the invention, reference being had to the annexed drawings, which form a part of this specification.

This invention relates to those harvesters which have special mechanism for threshing and winnowing grain and then delivering it into bags or sacks; and the first part of my improvements consists in connecting the riddle and concave of such harvesters with a flexible apron that catches and carries down to the cylinder all grain-heads that fall from the elevator-buckets, as hereinafter more fully described.

The second part of my improvements consists in providing the side-delivery carrier of such harvesters with a guard at one end and a flexible strip at its opposite end, which guard and strip prevent the loss of cut grain and compel its delivery along said carrier and discharge into the threshing appliances, as hereinafter more fully described.

Figure 1:
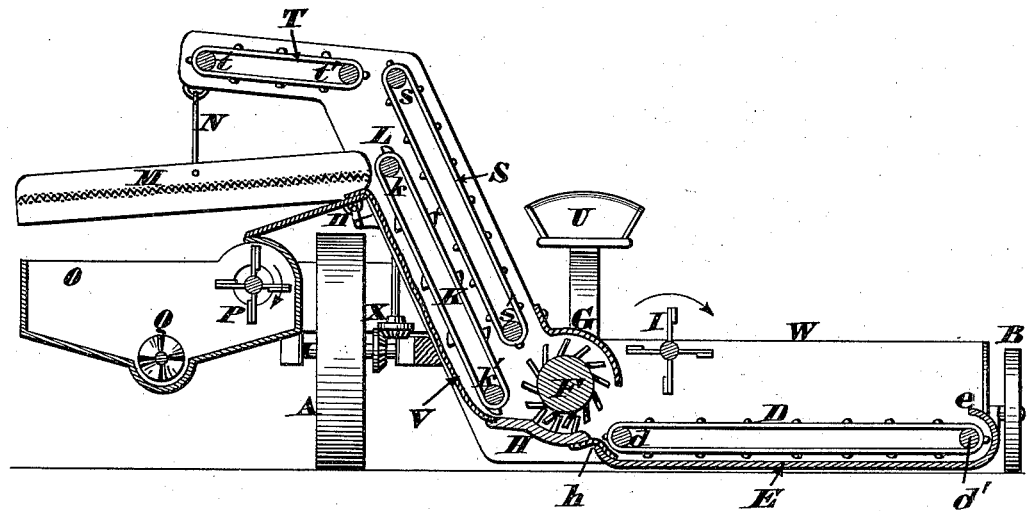
Figure 2:
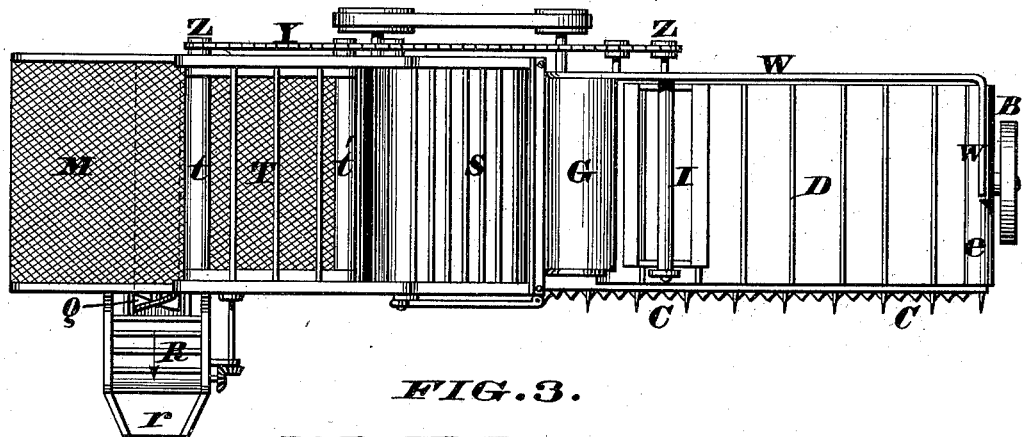
Figure 3:

In the annexed drawings, Figure 1 is a vertical section of my combined harvester and thresher. Fig. 2 is a plan of said implement. Fig. 3 is a plan of a portion of its threshing-cylinder.

A represents a master-wheel, and B a grain-wheel, that support any approved form of harvester, the cutters or sickles C of which are operated in the usual manner.

D is a side-delivery carrier composed of an endless belt of canvas passed around rolls $d$ $d'$ and furnished with a set of slats or cleats that advance the cut grain as rapidly as the sickles sever it. E is a sheet-metal guard secured under this carrier D and having its end $e$ near the grain-wheel B bent in the manner shown.

F is a threshing-cylinder preferably made of wood and armed with a series of spikes $f$, the latter being square in transverse section, as more clearly seen in Fig. 3. This cylinder revolves within a casing G and coacts with a concave H in stripping off the grain-heads.

$h$ is an india-rubber strip that connects the concave H with the guard E and serves as a flexible packing to permit a free passage of the slats of carrier D and yet prevents to a great extent the dragging of grain down under said carrier.

I is a small or secondary reel that assists the carrier D in conveying the cut grain toward the threshing-cylinder.

K is an inclined elevator passed around rolls $k$ $k'$ and armed with cups L, that catch the grain-heads as rapidly as they are severed and thrown back by the cylinder and conducts these heads up and discharges them upon a riddle or sieve M. This riddle is suspended from the harvester-frame by a pair of links, one of them being shown at N in Fig. 1, and is agitated or shaken by a crank-shaft $n$. Located below this sieve is a wind-box O, having a fan or blower P near one end and provided with a transverse screw conveyer Q, that delivers the cleaned heads to an inclined elevator R, having a discharge trough or spout $r$. Furthermore, the frame of this elevator may be provided with devices for holding bags or sacks in order that the grain may be discharged directly into the open mouths of such receptacles. S is another elevator passing around rolls $s$ $s'$ and armed with cleats or slats that catch up all straw and chaff thrown off by the threshing devices, then raise these waste materials and deliver them upon a carrier T. This carrier is made of endless belts or bands passed around rolls $t$ $t'$ and furnished with a system of transverse slats, by which arrangement any grain-heads that may be mixed in with the straw will sift through between said slats and fall upon the riddle M.

U is the driver's seat, which is omitted from Fig. 2 for the purpose of avoiding confusion in representing the operative parts of my implement.

V is a flexible apron attached at its upper end to the riddle M and extending down to the rear of concave H for the purpose of leading back to the latter any heads that may escape from the buckets L and not be caught upon said riddle.

W is a screen or fender at the back end of the grain-carrier D.

The main reel of the harvester is also omitted, as it need not be used in all cases. Again, the devices for transmitting motion from the master-wheel A to the operative parts of the harvester may be varied to suit the special construction of such implements; but as seen in the drawings said wheel drives level-gears X, and the latter actuate an endless chain Y, passing around sprocket-pinions Z, secured to the shafts of the rolls, &c.

The operation of my combined reaper and thresher is as follows: As the implement is drawn across a field of standing grain the sickles C first cut the stalks in the usual manner and permit them to fall upon the carrier D, which continuously travels toward the threshing attachments. Consequently this carrier, in connection with the small reel I, feeds the grain in at the mouth of casing G and causes said grain to be caught by the teeth $f$ of the rapidly-revolving cylinder F. These teeth drag the grain in against the teeth of concave H, the result being the ready and complete severing of the heads from the stalks, the separated heads being now caught up by the buckets L of elevator K and discharged upon the sieve M. The heads are then winnowed and finally delivered into sacks or bags, as previously described. If any part of the grain should fall down and get under the carrier D, such grain will be arrested by the guard E and then conveyed back toward the wheel B. At this place the grain will be stopped by the bend $e$ of said guard and be delivered upon the carrier D, to be again advanced to the threshing devices.

From the above description it is evident the several operations of cutting down the grain, separating the heads from the stalks thereof, then cleaning said heads, and finally sacking them are all carried on in one implement and with very little more power than is required to run a reaper or mower.

I claim as my invention—

1. In a reaper or mower, operating as herein described, the flexible apron V, connected to the riddle M, and concave H, for the purpose described.

2. In a reaper or mower, the side-delivery carrier D, guard E $e$, cylinder F, concave H, and flexible strip $h$, for the purpose described.

In testimony whereof I affix my signature in presence of two witnesses.

DAVID G. COYNER.

Witnesses:
ALBERT M. MACKERLEY,
EUGENE L. ARNOTT.